Dec. 18, 1928.

W. A. KATES 1,695,850

PHASE INDICATOR AND METHOD OF DETERMINING THE
PHASE RELATION OF ALTERNATING CURRENTS

Filed June 17, 1927   7 Sheets-Sheet 3

Willard A. Kates INVENTOR.

BY

Pennie, Davis, Marvin & Edmonds

HIS ATTORNEYS

Dec. 18, 1928.

1,695,850

W. A. KATES
PHASE INDICATOR AND METHOD OF DETERMINING THE
PHASE RELATION OF ALTERNATING CURRENTS
Filed June 17, 1927　　　7 Sheets-Sheet 4

Fig. 4.

Willard A. Kates INVENTOR.

BY
Pennie, Davis, Marvin & Edmonds
HIS ATTORNEYS

Patented Dec. 18, 1928.

1,695,850

UNITED STATES PATENT OFFICE.

WILLARD A. KATES, OF PHILADELPHIA, PENNSYLVANIA.

PHASE INDICATOR AND METHOD OF DETERMINING THE PHASE RELATION OF ALTERNATING CURRENTS.

Application filed June 17, 1927. Serial No. 199,445.

This invention relates to phase indicators and to methods of determining the phase relation between currents or voltages derived from one or more sources. This application is a continuation in part of my application Serial No. 73,411, filed December 5, 1925.

One of the objects of my invention is to provide an improved method for determining the time or phase relation of an alternating current or voltage with respect to another alternating current or voltage and to provide an improved phase indicator adapted to carry out this process.

My invention is particularly useful in connection with the determination of the phase relation between sources of polyphase current or voltage and the embodiments of my invention hereinafter described in detail represent typical applications of my invention as employed in determining the phase relation between a current or voltage and the currents or voltages of a polyphase circuit.

It may be helpful in explaining my invention to refer to the manner in which alternating current power is measured and to the common methods of protecting motors and generators and electrical apparatus in general. Instruments for measuring alternating current power are ordinarily provided with current and voltage elements which carry respectively the power line current and the power line voltage or currents and voltages proportional to those of the power line, these proportional currents and voltages being obtained by means of current and voltage transformers. In connecting up an instrument for measuring the power supplied by a source of polyphase current, it is essential that the corresponding current and voltage elements of the instrument carry currents derived from the same phase of the polyphase circuit. Where the polyphase circuit or source of polyphase current is located at a point remote from the instrument, the problem of determining the pair of current leads corresponding with a given pair of voltage leads is a difficult one, because it is oftentimes difficult and sometimes impossible to actually trace the current and voltage leads or wires from the polyphase power circuit. By employing my invention, however, it is possible to compare the phases of the currents carried by the current leads, with respect to those carried by the boltage leads, thus making it unnecessary to try and trace the current and voltage wires from the polyphase power circuit.

The protective relays and other protective devices commonly employed in connection with installations of alternating current machinery are usually provided with current and voltage elements not unlike those of an instrument for measuring polyphase power, such as the instrument above referred to. Here again, the problem of determining the phase of the current supplied by any pair of current leads with respect to the phase of the current supplied by any given pair of voltage leads presents difficulties not easily overcome by ordinary methods.

In general, the method of determining the phase relation of one or more currents or voltages with respect to other currents or voltages, in accordance with the specific embodiments of my invention hereinafter described in detail, comprises the adjustments of the phases of one source of polyphase current so as to produce a predetermined phase rotation and then bringing each phase of another source into an electrical relation with currents supplied by the first source to thereby indicate the relative time or phase relation. By the expresion "adjusting the phases of one source" I have reference to adjusting the connections of the wires carrying the currents of this source or currents proportional thereto, or the wires carrying currents proportional to voltages. Hereafter, in speaking of currents, I wish it to be understood that I mean either alternating currents or alternating voltages, and in speaking of a current or voltage proportional to another current or voltage, I am taking into consideration not only the magnitude of the currents or voltages, but the phase relations as well. For example, the current carried by the leads connected to the secondary winding of a voltage transformer has a definite value as compared with the voltage impressed on the primary winding of the transformer, and it also has a definite phase relation with respect to this impressed voltage.

In accordance with one embodiment of my invention, I adjust the phases of one source of polyphase current to produce a predetermined phase rotation and then selectively bring each phase of a second source of polyphase current into electromagnetic relation with currents supplied by the first source to cause a movable indicating element to assume a position depending upon the phase relation of the currents thus being compared. The instrument used for this purpose may be standardized or calibrated by using currents of known phase relation and after this has been done the position assumed by the indicating element when comparing phases of unknown relation gives a true indication of the actual phase relation.

To further explain my invention, I will now describe certain embodiments thereof illustrated by the accompanying drawings, it being understood that my invention is not limited to these particular embodiments but includes such modifications thereof as fall within the scope of the appended claims. In the accompanying drawings.

Figure 1:
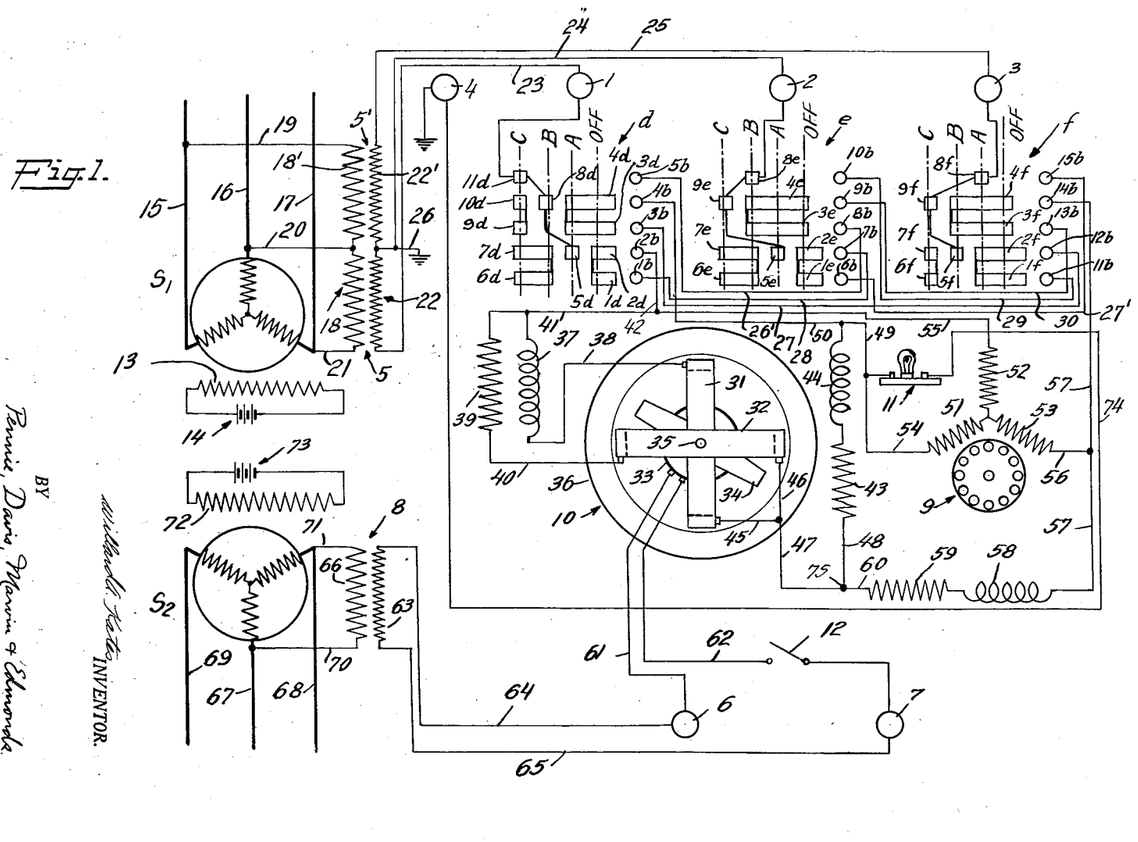
Fig. 1 is a diagrammatic representation of one embodiment of my improved phase indicator.

Referring to Fig. 1, I have illustrated the three terminals 1, 2 and 3 and the grounded terminal 4, the terminals 1, 2 and 3 being adapted to be connected to the two transformers 5 and 5' connected to a source $S_1$ of polyphase current. Terminals 6 and 7 are adapted to be connected to a transformer 8, which is in turn connected to a source $S_2$ of alternating current. In this figure, I have also illustrated three switches $d$, $e$ and $f$, each illustrated as being of the common controller type having four operating positions designated Off, A, B and C respectively. I have illustrated a small motor 9 and a phase indicating element 10, these parts being so interconnected that when the motor is caused to rotate in a predetermined direction, a rotating electromagnetic field of predetermined direction of rotation is established in the indicating element 10. A device such as an incandescent lamp 11 adapted to indicate the presence of an electric current is connected to form a part of this system, as will presently be explained in detail.

Neglecting for the moment the detail connections of the system shown in Fig. 1, it may be stated that in operating this apparatus, switches $d$, $e$ and $f$ are first selectively operated by moving them in turn to the B position. When one switch is moved to its B position, the other switches should occupy their Off positions. By manipulating the switches in this manner, it will be found that when one of the three switches is moved to its B position, the lamp 11 will not be lighted, whereas when either of the other switches is moved to its B position, the lamp will be lighted. For reasons hereinafter explained, the fact that the lamp remains unlighted when one of the switches occupies its B position indicates that this switch is connected to the grounded or neutral portion of the supply circuit. When this step of the process has been completed, the other two switches are manipulated in the manner hereinafter described until the motor 9 rotates in a predetermined direction. After this step has been performed, the terminals 6 and 7 are connected to a winding of the indicating element 10 as by closing a switch 12 whereupon a rotatable indicator forming a part of the element 10 will assume a position depending upon the phase relation of the current supplied to the terminals 6 and 7 with respect to the current supplied to the terminals 1, 2 and 3. This positive indication of the phase relation makes it possible to select a pair of leads carrying a current in phase with that carried by any pair of wires connected to terminals 1, 2 and 3, and it is likewise possible to synchronize the alternators generating the current supplied to the terminals of the phase indicator by regulating the prime mover for one alternator (for example that shown at $S_2$) so as to bring the current supplied to terminals 6 and 7 into phase with the currents supplied by any pair of leads connected to the terminals 1, 2 and 3.

Referring to the details of the system shown in Fig. 1, $S_1$ represents a three-phase alternator having a field winding 13 supplied with direct current from a suitable source indicated diagrammatically at 14. The alternator supplies electrical energy to power wires 15, 16 and 17. The primary windings 18 and 18' of the transformers 5 and 5' are connected across the power wires 15, 16 and 17 by leads 19, 20 and 21. The secondary windings 22 and 22' of these transformers are connected by leads 23, 24 and 25 to the terminals 1, 2 and 3 respectively, above mentioned. The lead 24 is connected to ground as shown at 26.

The switch D illustrated as being of the common controller type, comprises a plurality of contact segments $1^d$, $2^d$, $3^d$, $4^d$, $5^d$, $6^d$, $7^d$, $8^d$, $9^d$, $10^d$ and $11^d$. The segments $1^d$ and $2^d$ are interconnected. The segments 3ᵈ and 4ᵈ are interconnected. Segment 5ᵈ is connected to segment 8ᵈ and the later segment is in turn connected to segment 11ᵈ. Segments 6ᵈ and 7ᵈ are interconnected as are also segments 9ᵈ and 10ᵈ. A set of brushes shown at 1ᵇ, 2ᵇ, 3ᵇ, 4ᵇ, and 5ᵇ cooperates with the contact segments just described and it will be understood that these brushes are adapted to occupy the positions Off, A, B and C when the switch is operated.

The switch $e$ is similar to switch $d$ just described except for the number and arrangement of the contact segments. It comprises contact segments 1ᵉ, 2ᵉ, 3ᵉ, 4ᵉ, 5ᵉ, 6ᵉ, 7ᵉ, 8ᵉ and 9ᵉ. The pairs of contact segments 1ᵉ and 2ᵉ, 3ᵉ and 4ᵉ, 6ᵉ and 7ᵉ are interconnected. The segment 5ᵉ is connected to 9ᵉ and the latter segment is in turn connected to segment 8ᵉ. Brushes 6ᵇ, 7ᵇ, 8ᵇ, 9ᵇ and 10ᵇ cooperate with the contact segments of switch $e$.

The switch $f$ is similar to the switch $e$ except for the arrangement of the contact segments. Switch $f$ comprises interconnected pairs of contact segments 1ᶠ and 2ᶠ, 3ᶠ and 4ᶠ, 6ᶠ and 7ᶠ. It includes a contact segment 5ᶠ connected to contact segment 9ᶠ and the latter segment is connected to a segment 8ᶠ. Brushes 11ᵇ, 12ᵇ, 13ᵇ, 14ᵇ and 15ᵇ cooperate with the contact segments of switch $f$.

Referring to switches $d$, $e$ and $f$, brush 5ᵇ is connected to brush 8ᵇ by a wire 26′. Brush 3ᵇ is connected to brush 12ᵇ by a wire 27. Brush 1ᵇ is connected to brush 7ᵇ by a wire 28. Brush 10ᵇ is connected to brush 11ᵇ by a wire 29. Brush 9ᵇ is connected to brush 13ᵇ by a wire 30. Brush 15ᵇ is connected to brush 6ᵇ by wire 27′.

Figure 2:
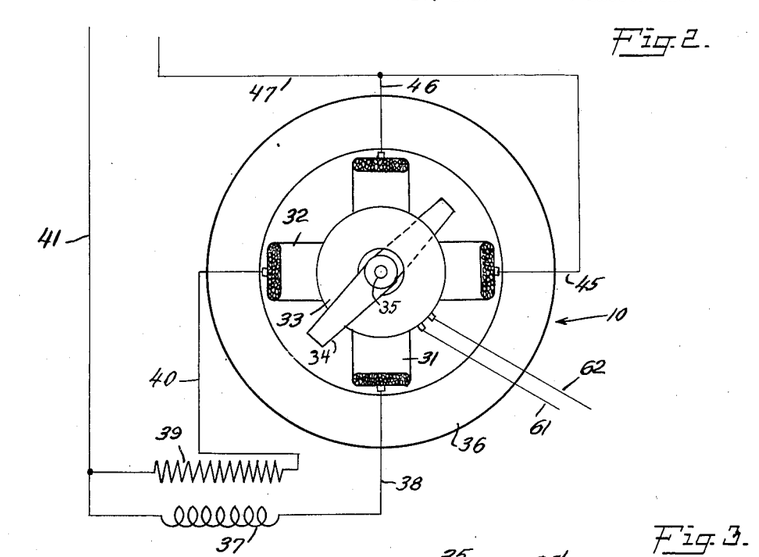
Fig. 2 is a plan view of a part of the apparatus shown in Fig. 1, portions being cut away to show details of construction.
Figure 3:
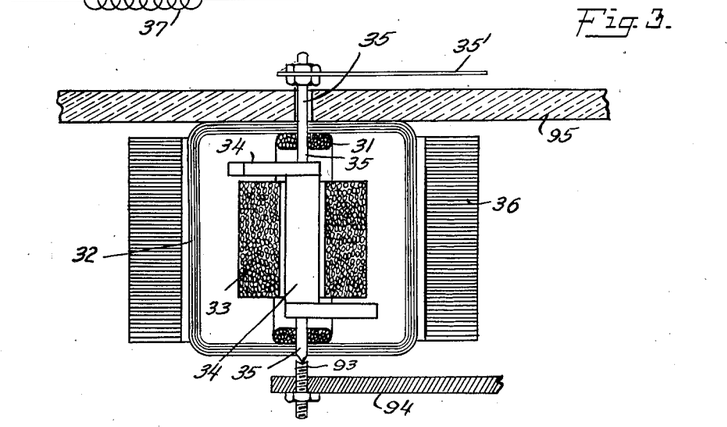
Fig. 3 is a section view of the device shown in Fig. 2 showing details of construction.

The indicating element 10, as illustrated in Figs. 1, 2 and 3, comprises a pair of stationary coils 31 and 32 arranged at right angles to each other and enclosing a third coil 33 surrounding a magnetic vane or sensitive element 34 mounted on a shaft 35. The shaft is rotatably mounted on suitable bearings. The shaft 35 carries a pointer or arm 35′, as shown in Fig. 3. The system of coils or windings is enclosed within a ring 36 of suitable magnetic material such as soft iron. This ring may be a laminated structure, as illustrated in detail in Fig. 3. This ring forms an efficient return circuit for the lines of force established when currents are supplied to the windings. The coil 31 is connected in series with a reactance 37 by means of a wire 38, and the other coil 32 of the field structure is connected in series with a resistance 39 by means of a wire 40. The resistance 39 and the reactance 37 are connected by means of wires 41 and 42 to brush 2ᵇ of switch $d$. The circuits 41, 39, 40, 32, 46, 47, and 41, 37, 38, 31, 45, 47, in parallel, form one branch or leg of a star or Y network. The second branch of this network is formed by the wire 48, the resistance 43, and the reactance 44, and is connected to the lamp 11 by the wire 49 and to the brush 4ᵇ of the switch $d$ by the wire 50. The third branch of the network is formed by wire 60, resistance 59, reactance 58, and wire 57, and is connected to the brush 14ᵇ of the switch $f$ by the wire 57. The common point of the star or Y network described is designated at 75.

The three coils or windings 51, 52 and 53 of the polyphase motor 9 are connected in the system in the following manner: The winding 51 is connected to the lamp 11 by a wire 54; winding 52 is connected to brush 2ᵇ of switch $d$ by wires 55 and 42; winding 53 is connected to brush 14ᵇ of switch $f$ by means of wires 56 and 57. It will be noted that the three windings 51, 52 and 53 of the motor 9 form a star or Y network which is connected to the brushes 2ᵇ, 4ᵇ and 14ᵇ of the switches $d$, $e$ and $f$ in parallel with the network described in the preceding paragraph and including the resistances and reactances 39—37, 43—44 and 59—58.

The terminals 6 and 7 of the apparatus are connected to coil 33 of the indicating element by means of wires 61 and 62 and switch 12, and these terminals are connected to the secondary winding 63 of transformer 8 by wires 64 and 65. The primary winding 66 of transformer 8 is connected across wires 67 and 68 of a power circuit including the wires 67 and 68 and the wire 69, by means of wires 70 and 71. The circuit represented diagrammatically by the wires 67, 68 and 69 is supplied with energy by the source $S_2$ of polphase current. This source of current may be an alternator having a field winding 72 supplied with direct current by any suitable means, such as the battery indicated at 73.

The current supplied at any time to the coil 31 of the indicating element is out of phase with respect to that carried by the coil 32 of this element, due to the fact that the coil 31 is connected in series with a reactance (37), whereas the coil 32 is connected in series with a resistance (39). A rotating field is therefore set up within this element, and when current is supplied to coil 33, the magnetic vane 34 will assume a position depending upon the phase relation between the current carried by coil 33 and the currents carried by coils 31 and 32. For example, the position of the vane 34, and likewise the position of the pointer 35′, may indicate whether the current supplied to the coil 33 is in phase with that supplied to coil 32, whether it leads the current supplied to coil 32 by 120°, or whether it lags behind this current 120°.

In the system shown in Fig. 1, terminal 2 of the instrument happens to be connected by means of wire 24, to the grounded point of the circuit supplying current to terminals 1, 2 and 3. Accordingly, when switch $e$ occupies its B position, the lamp 11 will remain unlighted, because both of its terminals are connected to ground. One terminal of the lamp 11 is connected directly to ground through the wire 74 and the terminal 4, while the other terminal of the lamp is connected to ground through the following circuit:—wires 49 and 50, brush 4ᵇ, contact segments 4ᵈ and 3ᵈ, and brush 3ᵇ of switch d, wire 27, brush 12ᵇ, contact segments 2ᶠ and 1ᶠ and brush 11ᵇ of switch f, wire 29, brush 10ᵇ and contact segment 8ᵉ of switch e, terminal 2 and wires 24 and 26 to ground.

If switch e is then left in its B position and switch d is moved to its A position, the terminals 1 and 2 will be connected across the terminals of coils 52 and 51 of the motor 9. Terminal 2 is connected to coil 51 through contact segment 8ᵉ, brush 10ᵇ, wire 29, brush 11ᵇ, contact segments 1ᶠ and 2ᶠ, brush 12ᵇ, wire 27, brush 3ᵇ, contact segments 3ᵈ and 4ᵈ, brush 4ᵇ, wire 50, wire 49 and wire 54. The terminal 1 is connected to the coil 52 through the contact segments 11ᵈ, 8ᵈ and 5ᵈ, brush 2ᵇ, wire 42 and wire 55.

If, while the switch e remains in its B position, the switch f is moved to its C position, the terminals 2 and 3 will be connected across the terminals of coil 51 and coil 53 respectively. The terminal 2 is connected to the coil 51 through the following circuit:—contact segment 8ᵉ, brush 10ᵇ, wire 29, brush 11ᵇ, contact segments 6ᶠ and 7ᶠ, brush 12ᵇ, wire 27, brush 3ᵇ, contact segments 9ᵈ and 10ᵈ, brush 4ᵇ, wires 50, 49 and 54, to coil 51. The terminal 3 is connected to the coil 53 through the contact segments 8ᶠ and 9ᶠ, brush 14ᵇ, and wires 57 and 56.

Accordingly, when switch e occupies its B position, switch d its A position, and switch f its C position, polyphase current will be supplied to the coils of motor 9, and this motor will rotate in a certain direction. If the instrument is adjusted so that the desired direction of rotation of the motor 9 is, say, the clockwise direction, and with the switches adjusted as just described, the motor operates in the counterclockwise direction, then it is merely necessary to move switch d to its C position and to move switch f to its A position. This changes the connection of the terminal 1 from the terminal of coil 52 to the terminal of coil 53, and it changes the connection of terminal 3 from the terminal of coil 53 to the terminal of coil 52. The connection of terminal 1 to the terminal of coil 53 is through contact segment 11ᵈ, brush 5ᵇ, wire 26, brush 8ᵇ, contact segment 3ᵉ, contact segment 4ᵉ, brush 9ᵇ, wire 30, brush 13ᵇ, contact segment 3ᶠ, contact segment 4ᶠ, brush 14ᵇ, wire 57 and wire 56. The connection of terminal 3 to the terminal of coil 52 is established through contact segment 8ᶠ, brush 15ᵇ, wire 27′, brush 6ᵇ, contact segments 1ᵉ and 2ᵉ, brush 7ᵇ, wire 28, brush 1ᵇ, contact segments 1ᵈ and 2ᵈ, brush 2ᵇ and wires 42 and 55.

Assuming that the adjustment of switches d, e and f just described produces the desired predetermined rotation of the motor 9 in a clockwise direction, then terminal 1 is connected to reactance 58 with the current flowing to the junction point 75 between wires 60, 48 and 47, terminal 2 is connected to wire 50, which in turn is connected to the reactance 44 and to the resistance 43, the current flowing through these conductors and through the wire 48 to the junction point 75 between wires 47 and 60. The terminal 3 is connected to the resistance 39 and the reactance 37, the current flowing through these coils and through coils 32 and 31 of the indicating element to the junction point 75. It is not deemed necessary to trace these circuits, for this state of facts is readily apparent upon referring to Fig. 1, bearing in mind the fact that switch d occupies its C position, switch e, its B position, and switch f, its A position. The phases of the currents flowing in the star or Y connection having its center point at 75 have a predetermined relation because of the fact that the switches d, e and f have been so manipulated as to produce a predetermined direction of rotation of the motor 9, and it will be understood that split phase currents flow through coils 31 and 32 of the indicating element producing a rotating field within this element, the rotation of this electromagnetic field bearing a definite relation to the direction of rotation of the motor 9.

When the switches d, e and f have been adjusted to their proper positions as just described, the switch 12 may be closed to supply current to the winding 33 of the indicating element 10, and upon closing the switch 12, the magnetic vane 34 will assume a definite position, depending upon the phase relation between the current supplied to the coil 33 and the currents flowing through coils 31 and 32. The pointer 35′ will indicate whether the current supplied to coil 33 is leading the current supplied to coils 32 and 31, or is lagging behind these currents, and the amount of the lead or lag, as the case may be, will be shown by the angular position of the pointer.

Figure 1A:
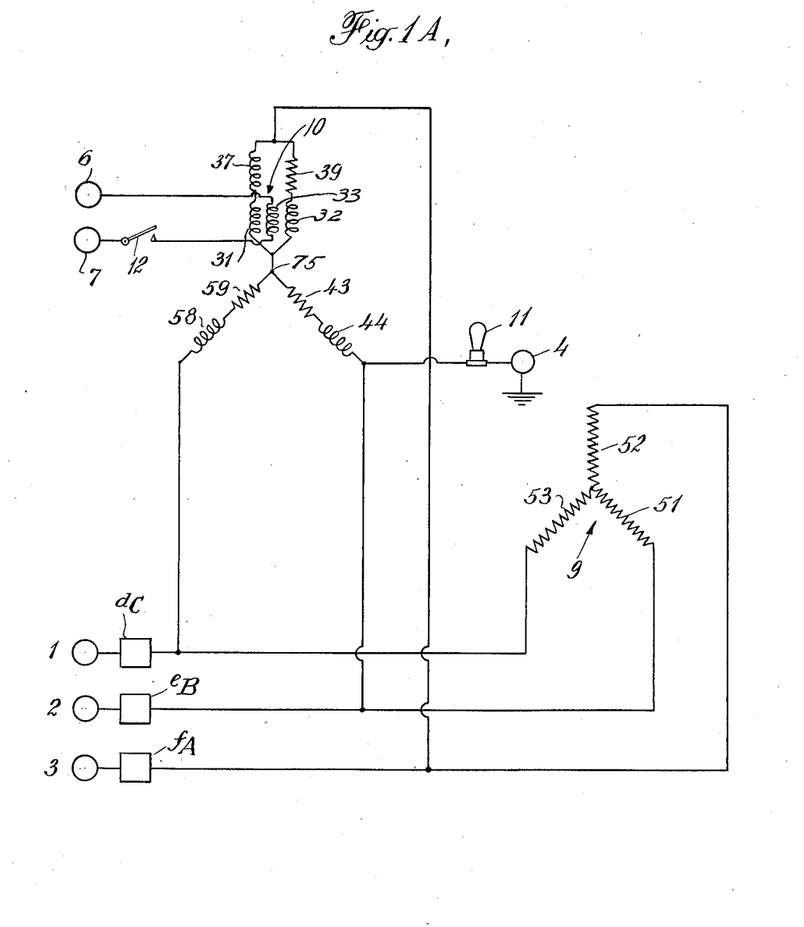
Fig. 1A is a connection diagram of certain of the parts illustrated in Fig. 1.

In Fig. 1ᴬ I have illustrated a connection diagram for certain parts of the apparatus shown in Fig. 1, the relation of the parts illustrated in Fig. 1ᴬ being in accordance with the example previously described in detail, that is with switch d occupying its C position, switch e its B position and switch f its A position. For the sake of simplicity the switches d, e and f are not shown in detail in Fig. 1ᴬ but the connections shown in this figure represent the conditions existing when these three switches occupy the three positions just mentioned. In Fig. 1ᴬ the instrument 10 is shown in diagrammatic form with the coils 31 and 32 and associated elements 37 and 39 all connected in star relation with respect to the elements 58 and 59, and 43 and 44 respectively. The terminal 1 is shown connected thru the switch *d* to the inductance element 58; the terminal 2 is connected thru switch *e* to the inductance element 44; and the terminal 3 is connected thru the switch *f* to the elements 37 and 39. The windings 53, 52 and 51 of the motor 9 are connected to the terminals 1, 2 and 3 respectively and, as described above, the switches *d*, *e* and *f* have been so adjusted as to produce a predetermined direction of rotation of the motor 9 and consequently a predetermined condition of the field of the instrument 10 Under these conditions the instrument 10 is capable of indicating whether the phase of the current supplied to the coil 33 of the instrument 10 coincides with phase A of the source connected to terminals 1, 2 and 3, or leads this phase by an indicated amount or lags behind phase A an indicated amount.

Figure 4:
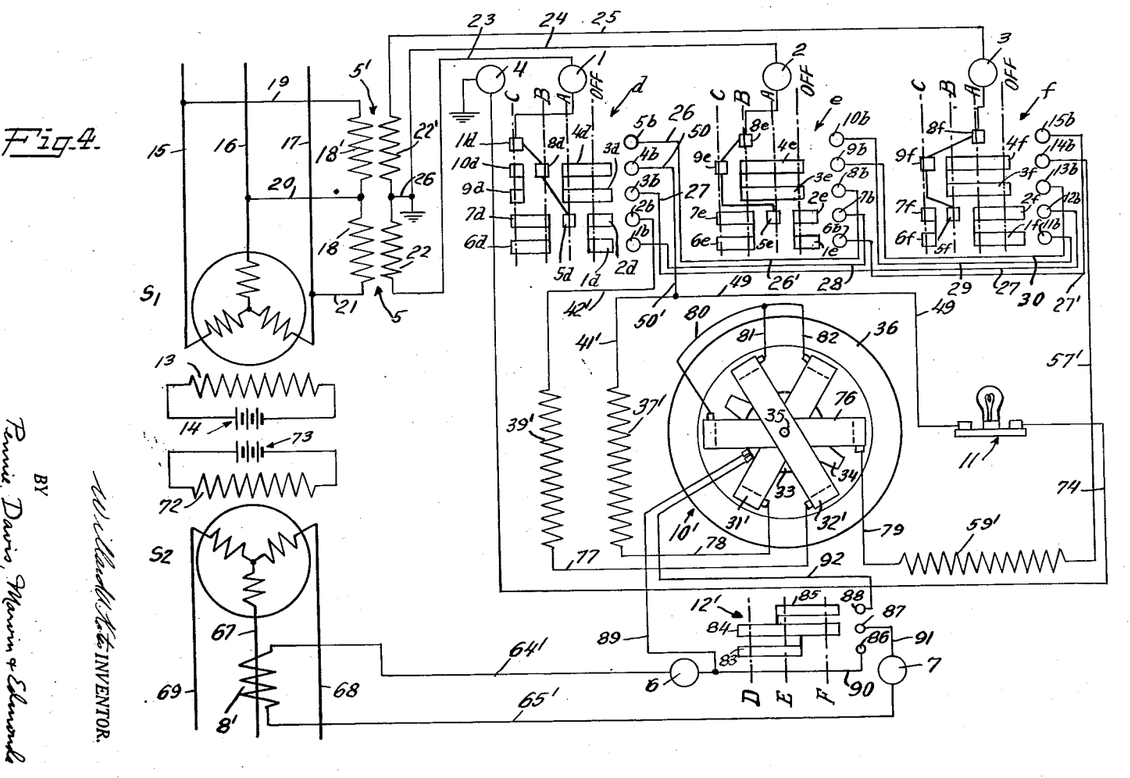
Fig. 4 is a diagrammatic view of another embodiment of my improved phase indicator.

The system shown in Fig. 4 is in many respects identical with that shown in Fig. 1, and the similar parts in the two figures have been designated by the same reference characters. In Fig. 4, I have illustrated a combination motor and indicating element 10', adapted to take the place of the motor 9 and indicating element 10 shown in Fig. 1. The combination device 10' comprises coils 31', 32', 76 and 33, a magnetic vane 34, and a magnetic ring 36. The coils 31', 32' and 76 are connected in series with resistance elements 37', 39' and 59' respectively, and it will be understood that when current is supplied to these three coils, a rotating field is established, and then when current is supplied to coil 33, the magnetic vane 34 assumes a position depending upon the phase relation of the current flowing in coil 33 with respect to the currents flowing through coils 31', 32' and 76.

The resistance element 39 is connected to brush 2$^b$ by a wire 42'; the resistance element 37' is connected to brush 4$^b$ by wire 41' and wire 50'; and resistance element 59' is connected to brush 14$^b$ by wire 57'. Resistance element 39 is connected to coil 32' by wire 77; resistance element 37' is connected to coil 31' by wire 78; and resistance element 59' is connected to coil 76 by wire 79. The coils 31', 32' and 76 are interconnected by wires 80, 81 and 82.

In Fig. 4, a current transformer 8' is shown in place of the voltage or potential transformer 8 of Fig. 1, and this current transformer is connected to terminals 6 and 7 by wires 64' and 65'. A switch 12' having interconnected contact segments 83, 84 and 85 and brushes 86, 87 and 88 serves to connect the current transformer with the coil 33 of the indicating element 10'. The terminal 6 is connected to a terminal of coil 33 by a wire 89, and with brush 86 by a wire 90. Terminal 7 is connected to brush 87 by a wire 91. Brush 88 is connected to a terminal of coil 33 by a wire 92. Accordingly, when the switch 12' occupies the position designated F, current flows from the current transformer 8' through wire 65', terminal 7, wire 91, brush 87, contact segment 84, contact segment 85, brush 88, wire 92, coil 33, wire 89, terminal 6 and wire 64' back to the current transformer. When the switch occupies the position designated E, the current transformer is short-circuited and no current is supplied to the coil 33 of the indicating element. The short-circuit connection is established through wire 65', terminal 7, wire 91, contact segment 84, contact segment 83, brush 86, wire 90, terminal 6 and wire 64'. The coil 33 is likewise short-circuited, through wire 92, brush 88, contact segments 85, 84 and 83, brush 86, wire 90 and wire 89. In the position designated D, the current transformer is short-circuited and the coil 33 is disconnected.

In the system shown in Fig. 4, currents corresponding in phase and voltage with those flowing in the power circuit supplied by $S_1$, are supplied to terminals 1, 2 and 3 and a current proportional to or corresponding with the current flowing in wire 67 of the power circuit supplied by $S_2$ is supplied to the terminals 6 and 7. This shows the application of the invention to the matter of comparing the phase of a current to the phases of the voltages of the polyphase circuit. In Fig. 1, on the other hand, the currents supplied to the instrument in all cases correspond with the voltages.

Figure 5:
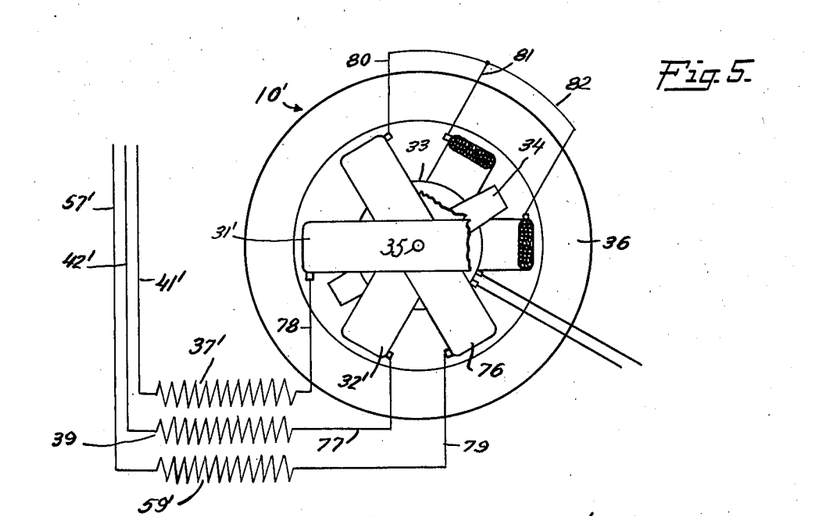
Fig. 5 is a plan view of a part of the apparatus shown in Fig. 4, portions being cut away to show details of construction.
Figure 6:
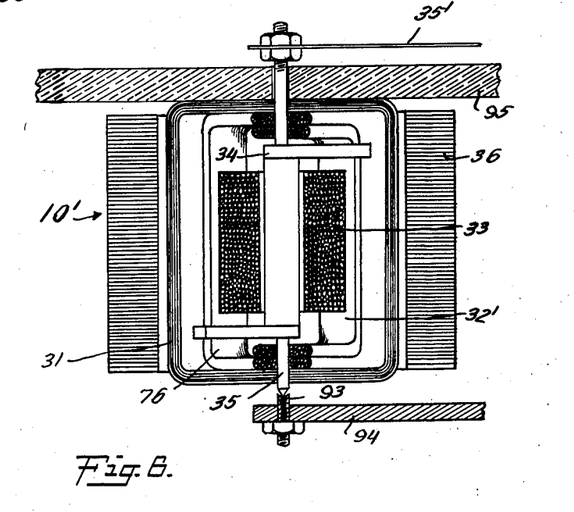
Fig. 6 is a section view of the device shown in Fig. 5.

Figs. 5 and 6 show details of construction of the combination motor and indicating element 10' of Fig. 4. The shaft 35 is mounted on a bearing 93 carried by a suitable support 94 and the shaft projects through an instrument panel 95 and carries the pointer or indicator 35'. In fact, the details of construction of this device are the same as those shown in Figs. 2 and 3, where like parts have been given the same reference characters, the only important difference being the addition of coil 76 and the rearrangement of coils 31 and 32, as shown at 31' and 32'. It will be understood that when connected to operate as a motor, the pointer 35' will rotate clockwise or counterclockwise, whereas when it is operating as an indicating device proper, the pointer 35' will assume a definite position determined by the phase relations of the currents flowing in the coils of the device.

Figure 7:
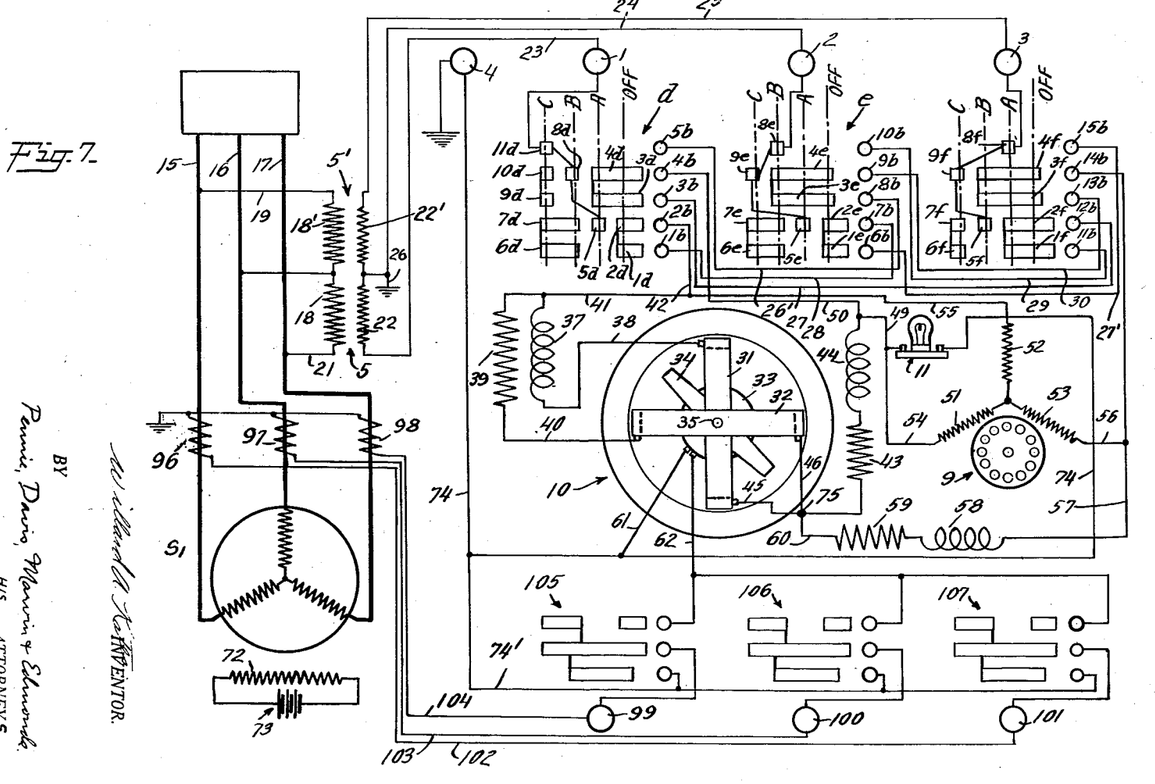
Fig. 7 is a diagrammatic view of still another embodiment of my improved phase indicator.

The system shown in Fig. 7 is identical with that shown in Fig. 1, except that means have been provided for readily comparing the phases of the currents flowing in a polyphase circuit with polyphase voltages derived from the same source.

In Fig. 7, I have illustrated polyphase current transformers having interconnected and grounded coils 96, 97 and 98, these coils being connected to terminals 101, 100 and 99 by wires 102, 103 and 104. Switches 107, 106 and 105 are constructed and arranged so as to make it possible to selectively connect each phase of the polyphase currents to the coil 33 of the indicating element 10. These switches, the construction and arrangement of which are believed to be apparent from the drawings, can be used to short-circuit the coils of the current transformer by connecting them to the grounded wire 74 through a wire 74'. The current transformers may be regarded as one source of current and the transformers 18 and 18' as another; in so far as the operation of the invention is concerned it is immaterial whether all of these transformers derive their energy from a common source or from separate sources. The current which flows thru the current transformers shown in Fig. 7 is not the same current which flows thru the transformers 18 and 18' and accordingly, these devices may be regarded as separate sources of current in so far as the indicating instrument is concerned, even though they both derive their energy from a common source.

Figure 8:
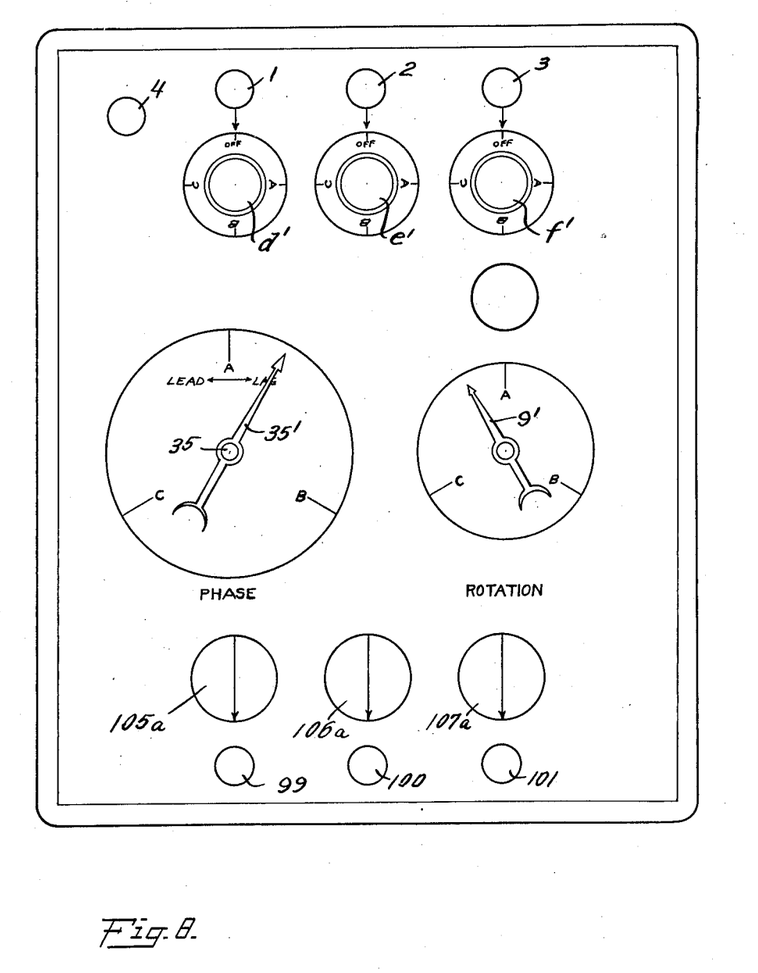
Fig. 8 is a plan view of a complete instrument of the type illustrated in Fig. 7 showing dials for use in operating the instrument and indicators for showing phase rotation and phase relation.

In Fig. 8, I have illustrated an instrument panel suitable for the type of instrument illustrated diagrammatically in Fig. 7 and provided with suitable dials, terminals and indicators or pointers. The corresponding parts of Figs. 7 and 8 are designated by the same reference characters. Knobs or dials 105$^a$, 106$^a$ and 107$^a$ are connected so as to actuate the switches 105, 106 and 107 respectively. The pointer 9' is connected to the shaft of the motor 9 and serves to indicate the direction of rotation of the motor. The pointer 35' indicates the phase position or time relation of the current supplied to any one of the terminals 99, 100 and 101, as compared with the currents supplied to terminals 1, 2 and 3. Dials of knobs $d'$, $e'$ and $f'$ having the switch positions Off, A, B and C marked thereon, are connected to the switches $d$, $e$ and $f$.

While I have explained my invention by describing in detail certain specific embodiments thereof and certain applications of my invention, it is to be understood that the invention is not limited to these particular embodiments, but includes such modifications thereof as fall within the scope of the appended claims. I have explained the application of my invention as applied to certain purposes, but it will be readily appreciated by those skilled in the art that it can be applied to many purposes other than those mentioned above. The various details of the embodiments of my invention above described may be modified and some of them may be even eliminated without sacrificing all of the advantages of my invention.

I claim:

1. In a device of the type described, the combination with a source of polyphase current and a second source of polyphase current, of means for indicating phase rotation, adjustable means for connecting the first source to said indicating means so as to produce a predetermined indication and means responsive to the electrical condition of said indicating means and of the second source for selectively indicating the phase relation of each phase of the second source with respect to the phases of the first source.

2. In a device of the type described, the combination with a source of polyphase current and a second source of polyphase current, of means for indicating phase rotation, adjustable means for connecting the first source to said indicating means so as to produce a predetermined indication and electromagnetic means responsive to the electrical condition of said indicating means and of the second source for selectively indicating the phase relation of each phase of the second source with respect to the phases of the first source.

3. In a device of the type described, the combination with a source of polyphase current and a second source of polyphase current, of means for indicating phase rotation, adjustable means for connecting the first source to said indicating means so as to produce a predetermined indication and electromagnetic means for selectively indicating the phase relation of each phase of the second source with respect to the phases of the first source, said electromagnetic means comprising means responsive to the electrical condition of the phase rotation indicating means, for producing a rotating magnetic field and means responsive to said rotating magnetic field and to the electrical condition of said second source.

4. In a device of the type described, the combination with a source of polyphase current and a second source of polyphase current, of means for indicating phase rotation, adjustable means for connecting the first source to said indicating means so as to produce a predetermined indication, means electrically connected to said indicating means for producing a rotating magnetic field, means responsive to this magnetic field, and means for selectively connecting each phase of the second source to said last mentioned means.

5. In a device of the type described, the combination with a source of polyphase current and a second source of polyphase current, of means for indicating phase rotation, adjustable means for connecting the first source to said indicating means so as to produce a predetermined indication, means electrically connected to said indicating means for producing a rotating magnetic field, means responsive to this magnetic field and a plurality of independently operable switches for selectively connecting each phase of the second source to said last mentioned means.

6. In a device of the type described, the combination with a source of polyphase current and a second source of polyphase current, of means for indicating phase rotation, and means responsive to the electrical condition of said indicating means and of said second source for selectively indicating the phase relation of each phase of the second source with respect to the phases of the first source, the said first mentioned indicating means comprising a motor and a plurality of independently operable switches for connecting the motor to the first source of current.

7. In a device of the type described, the combination with a source of polyphase current and a second source of polyphase current, of means for indicating phase rotation, means electrically connected to the said indicating means for producing a rotating magnetic field, means responsive to this magnetic field, and including a magnetizable vane and a magnetizing coil therefor, and means for selectively connecting each of the phases of the second source to said last mentioned means.

8. In a device of the type described, the combination with a source of polyphase current having one phase grounded, and a second source of polyphase current, of a current indicating device having a grounded connection, a plurality of independently operable switches for selectively connecting each phase of the first source to said device to ascertain the grounded phase of said source, means for indicating phase rotation, means for connecting said first source to said phase rotation indicator to produce a predetermined indication thereof, and means responsive to the electrical condition of both sources for selectively indicating the phase relation of each phase of the second source with respect to the phases of the first source.

9. In a device of the type described, the combination with a source of polyphase current having one phase grounded, and a second source of polyphase current, of a current indicating device having a grounded connection, a plurality of independently operable switches for selectively connecting each phase of the first source to said device to ascertain the grounded phase of said source, means connected to said switches adapted to indicate phase rotation, and means responsive to the electrical condition of said phase rotation indicating means and of said second source for selectively indicating the phase relation of each phase of the second source with respect to the phases of the first source.

10. In a device of the type described, the combination with a source of polyphase current having one phase grounded, and a second source of polyphase current, of a current indicating device having a grounded connection, a plurality of independently operable switches for selectively connecting each phase of the first source to said device to ascertain the grounded phase of said source, means connected to said switches adapted to indicate phase rotation, and means responsive to the electrical condition of said phase rotation indicating means and of said second source for selectively indicating the phase relation of each phase of the second source with respect to the phases of the first source, the said grounded connection being common to the current indicating device, the phase rotation indicating device and the phase relation indicating device.

11. In a device of the type described, the combination with a source of polyphase current having one phase grounded, and a second source of polyphase current, of a current indicating device having a grounded connection, a plurality of independently operable switches for selectively connecting each phase of the first source to said device to ascertain the grounded phase of said source, means connected to said switches adapted to indicate phase rotation, and means responsive to the electrical condition of said phase rotation indicating means and of said second source for selectively indicating the phase relation of each phase of the second source with respect to the phases of the first source, the said last mentioned means including a device connected to the first source and adapted to produce a rotating field, indicating means responsive to said rotating field, and means for selectively connecting each phase of said second source to said last mentioned indicating means.

12. In a device of the type described, the combination with a source of polyphase current having one phase grounded and a second source of polyphase current, of a current indicating device having a grounded connection, a plurality of independently operable switches for selectively connecting each phase of the first source to said device to ascertain the grounded phase of said source, means for electrically interlocking said switches, means connected to said switches for indicating phase rotation, and means responsive to the electrical condition of said phase rotation indicating means and of said second source for selectively indicating the phase relation of each phase of the second source with respect to the phases of the first source.

13. The method of ascertaining the phase positions of the phases of one source of polyphase current with respect to the phases of a second source of polyphase current which comprises connecting the first source to a network adapted to set up a rotating electromagnetic field so as to produce therein a field of predetermined direction of rotation, and selectively supplying current from each phase of the second source to an element located in said electromagnetic field.

14. The method of ascertaining the phase position of the phases of one source of polyphase current having a grounded phase, with respect to the phases of a second source of polyphase current which comprises connecting the grounded phase of said first source to ground connecting the other phases of the first source to a network adapted to set up a rotating electromagnetic field so as to produce therein a field of predetermined direction of rotation, and selectively supplying current from each phase of the second source to an element located in said electromagnetic field.

In testimony whereof I affix my signature.

WILLARD A. KATES.